Oct. 25, 1927.
J. W. BRIGHT
1,646,680
BEET HARVESTER AND TOPPING MACHINE
Filed Sept. 21, 1926   3 Sheets-Sheet 2
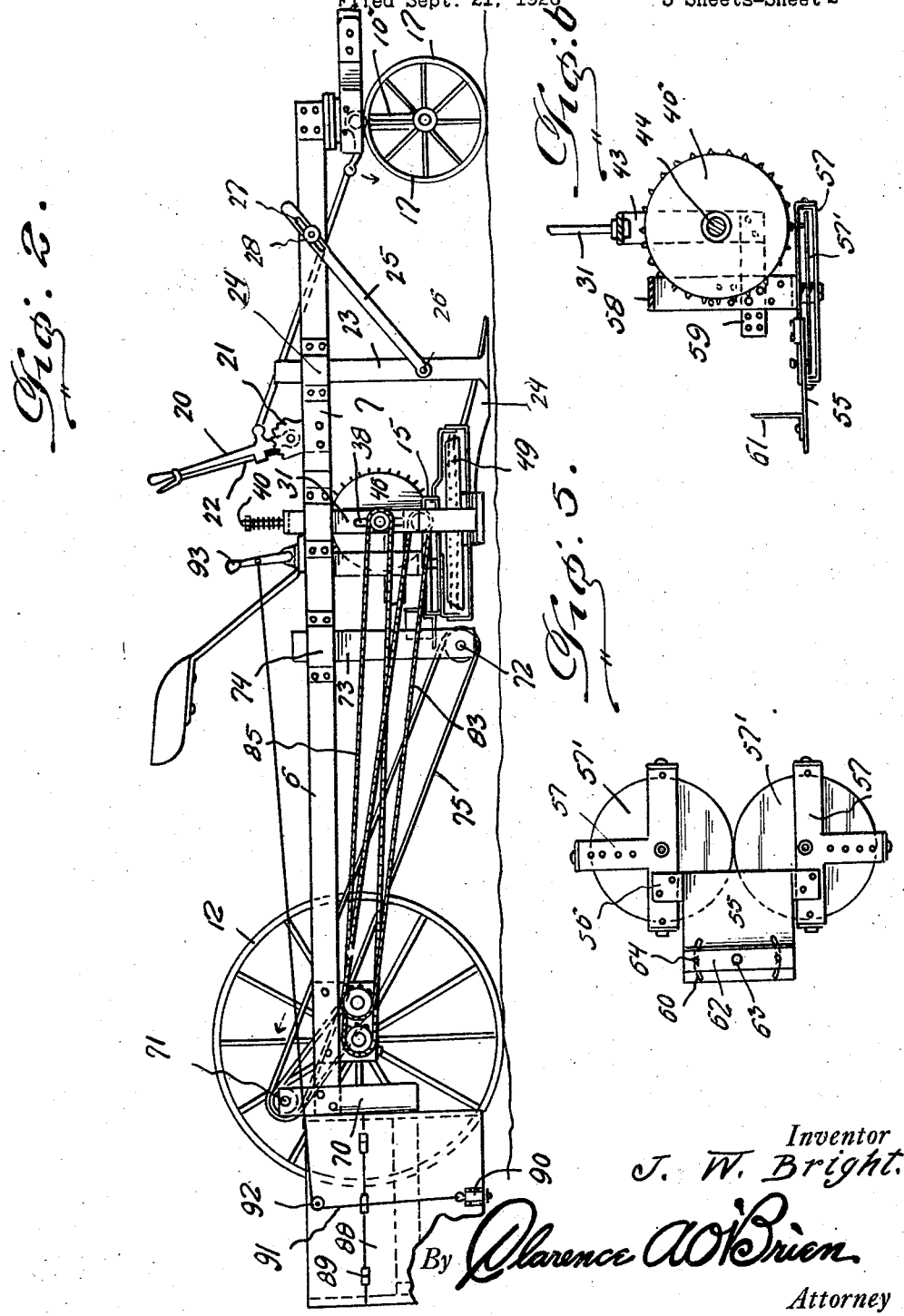
Inventor
J. W. Bright.
By Clarence A O'Brien
Attorney Oct. 25, 1927.
J. W. BRIGHT
1,646,680
BEET HARVESTER AND TOPPING MACHINE
Filed Sept. 21, 1926      3 Sheets-Sheet 3
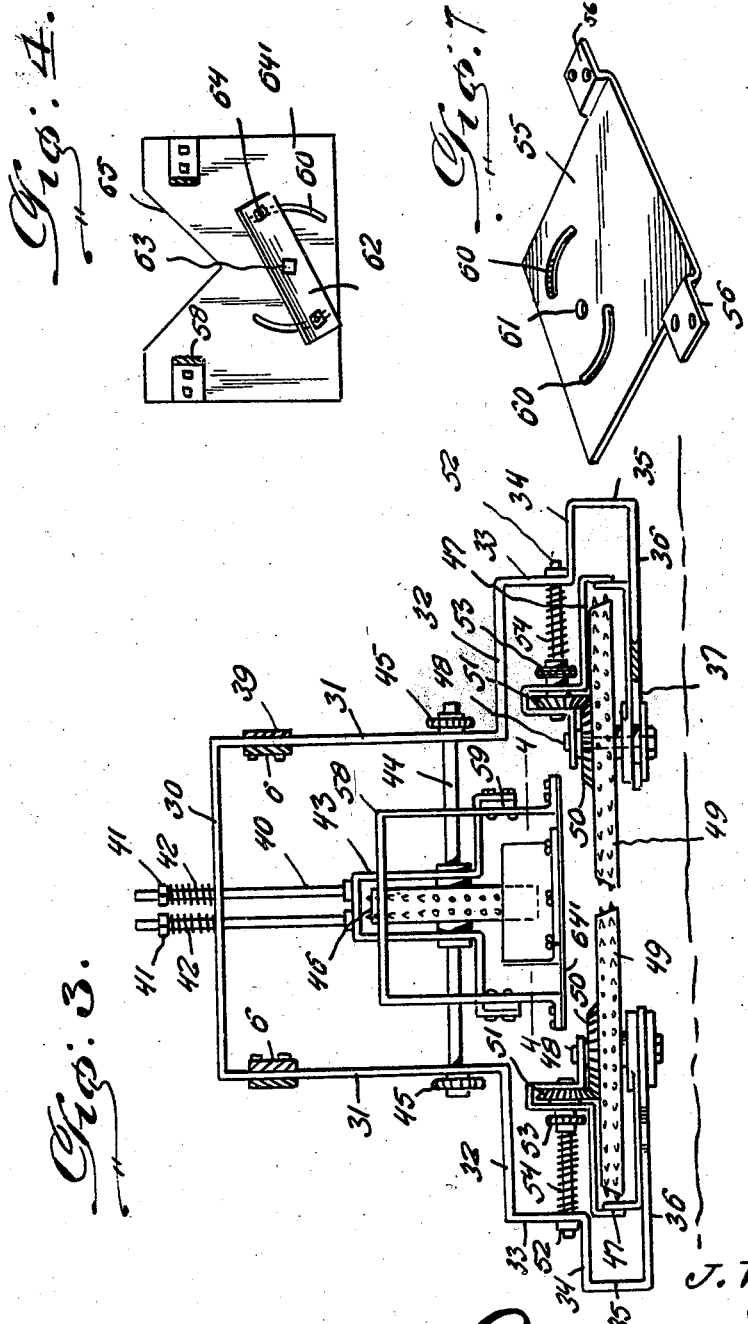
Inventor
J. W. Bright,
By Clarence A. O'Brien
Attorney Patented Oct. 25, 1927.

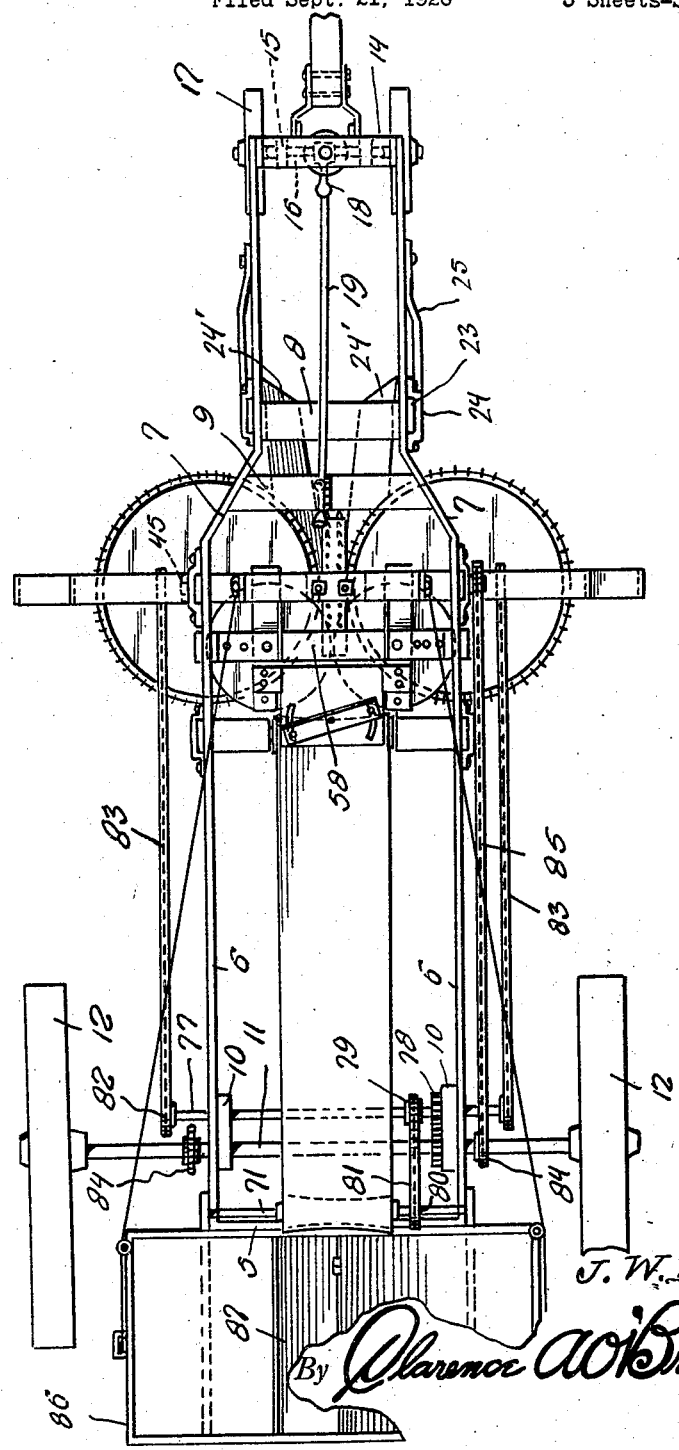

1,646,680

UNITED STATES PATENT OFFICE.

JOHN W. BRIGHT, OF GRAND JUNCTION, COLORADO.

BEET HARVESTER AND TOPPING MACHINE.

Application filed September 21, 1926. Serial No. 136,843.

The present invention relates to a machine for harvesting and topping beets and has for its principal object to provide a wheeled frame having digging means thereon which will elevate the beets to a topping mechanism suspended from the frame. The topping mechanism will deliver the beets to a conveyer which in turn will deliver them to a receptacle.

An important object of the invention lies in the provision of a topping mechanism which includes a plurality of rotatable elements resiliently mounted and positioned to guide a beet past a cutter which will sever the top from the beet.

Another very important object of the invention lies in the provision of a machine of this nature with a simple construction that will prove thoroughly reliable and efficient in operation, a structure which is strong and durable and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the machine embodying the features of my invention, Fig. 2 is a side elevation thereof, Fig. 3 is a vertical section therethrough showing the beet topping means, Fig. 4 is a detailed horizontal section taken substantially on the line 4—4 of Fig. 3, Fig. 5 is a plan view showing a modification of the cutting structure, Fig. 6 is a vertical section therethrough, Fig. 7 is a perspective view of the blade.

Referring to the drawing in detail it will be seen that the frame includes a rear transverse rail 5 having side rails 6 projecting forwardly therefrom and at intermediate portions converging towards each other as at 7 so that the front extremities of the sides are closer together than the rear extremities thereof. Cross braces 8 and 9 are disposed between the side rails 6, one forwardly of the portions 7 and one between the portions 7. Plates 10 are fixed to the rear portions of the rails 6 and have journaled therethrough an axle shaft 11 on the extremities of which are fixed rear wheels 12. A cross member 14 extends between the front extremities of the side rails 6 and has rockably mounted in brackets 15 an inverted U-shaped shaft 16 on the extremities of which are journaled front wheels 17. A crank 18 projects from the axle 16 and a link 19 is engaged therewith and also engaged with a lever 20 pivoted on a bracket 21 rising from the cross member 9 and having a series of teeth thereon with which cooperates a suitable detent 22 on the lever 20. Thus the forward end of the frame may be raised and lowered. Vertical standards 23 are mounted in keeper brackets 24 on the rails 6 in front of the portions 7 and support digging and guiding elements 24' which are extended upwardly and rearwardly and converge rearwardly towards each other for the purpose of digging the beets from the ground and the beets will be forced upwardly and rearwardly to a topping mechanism which will be described later. Braces 25 are pivotally engaged as at 26 with intermediate portions of the standards 23 and their extremities are provided with slots 27 through which project suitable fastening elements 28. The raising and lowering of the front end of the frame, as will be seen, governs the digging depths of the element 24'. For the purposes of this application, the digging and elevating mechanism for the frame is to be considered conventional.

The topping mechanism supporting structure includes a horizontal upper member 30 having depending legs 31 at its ends. These legs 31 terminate in horizontal portions 32 which in turn terminate in vertical portions 33. The portions 33 terminate in horizontal outwardly extending portions 34. The portions 34 terminate in vertical portions 35 depending downwardly and these vertical portions 35 terminate in inwardly directed horizontal portions 36. The extremities of the portions 36 are slotted as at 37. The legs 31 are vertically slotted as at 38. These legs 31 extend through keeper brackets 39 on the side rails 6 so that the supporting section may be adjusted vertically. Stems 40 are slidable through spaced openings in the member 30 at the center thereof and have nuts 41 on their upper extremities and coil springs 42 disposed about the rods impinging against the top member 30 and the nuts 41. A frame 43 is suspended from the lower extremities of the rods 40 and a shaft 44 is journaled transversely through the frame 43 and extends through slots 38 in the legs 31 and has sprockets 45 on its extremities. A wheel or roller 46 is fixed to the shaft 44 in the frame 43 and has a roughened periphery which may be formed by teeth or other projections. Frames 47 are mounted on the horizontal portions 36 of the legs 31. Vertical shafts 48 are journaled in the frames 47 and extend through the slots 37. Rollers or wheels 49 are fixed on the shafts 48 and extend in a horizontal plane. The peripheries of these wheels 49 are roughened and beveled as is clearly indicated in Fig. 3. Beveled gears 30 are mounted on the shafts 48 within the frames 47 and mesh with beveled pinions 51 on shafts 52 which are journaled in the frames 47 and have their extremities journaled in the vertical portions 33 and slidable therethrough. Sprockets 53 are mounted on shafts 52 and coil springs 54 are disposed about these shafts 52 and impinge against the sprockets and against the vertical portions 33 for normally holding the wheels in relative close proximity. It will be seen that the wheels 49 and frames 47 may be pushed away from each other by the beets depending upon the size of the beets.

In Figs. 1, 5 and 7 I have shown one embodiment of a cutting mechanism. This embodiment includes a blade 55 held in place by clamps 56 engaged on arms of frame 58 and on frames 57 in which are journaled circular or disc cutters 57'. On the blade 55 there is mounted a guide 62 having a pin 63 piercing an opening 61 and bolts 64 piercing arcuate slots 60 so that the guide 62 may be adjusted as desired. The frame 58 is carried on the frame 43 by arms 59. In Fig. 4 a blade 64' is shown having slots 60 the same as plate 50 so that the guide 62 may be mounted thereon in a manner previously indicated. This blade 64' is attached directly to the arms of the frame 58 and has a V-shaped cutting edge 65. The blade 64 is shown in Fig. 3.

As the machine moves forwardly and the front end thereof is lowered to engage the elements 24' in the ground, it will be seen that the beets will be pulled from the ground and move up the inclined portions of the elements 24' to be engaged by wheels 46 and 47 which wheels will move the beets so that the tops will be severed therefrom by blade 64' or blade 55 depending on which embodiment of the cutting mechanism is used. It will also be noted that the rollers 46 and 49 are yieldably mounted so as to accommodate different sized beets. These wheels 46 and 49 will deliver the beets rearwardly to an elevating mechanism which will now be described in detail.

Standards 70 rise and depend from the side rails 6 by having intermediate portions secured to said side rails. A shaft 71 is journaled in the upper ends of the standards 7. A shaft 72 is journaled in the lower ends of standards 73 which are adjustably mounted on the side rails by keeper brackets 74. An endless belt 75 is trained over rollers mounted on the shafts 71 and 72 for receiving the beets from the wheels 46 and 49. A shaft 77 is journaled in the plates 10 in front of the shaft 11 and is operated by the axle shaft 11 through gears 78. A sprocket 79 is mounted on the shaft 77 and a sprocket 80 is mounted on a shaft 71. A chain 81 is trained over the sprockets 79 and 80. Sprockets 82 are mounted on the ends of the shaft 77 to the outside of the main frame and have trained thereover chains 83 which are also trained over sprockets 53 for operating the rollers 49. Sprockets 84 are mounted on the axle shaft 11 and have chains 85 trained thereover which are also trained over the sprockets 45 for operating the roller 46. A receptacle 86 is mounted to the rear of the main frame on the standards 70 and has a hinged baffle 87 therein so as to deflect the beets delivered into the receptacle either to one side or the other. The sides of the receptacle have hinged lower portions 88 hinged as at 89 with latch structure 90 associated therewith. Cables 91 are engaged with the latch structures for moving them to released position. These cables are trained over sleeves 92 and are engaged with a lever 93 mounted at a convenient point for operation upon the driver's seat.

It is thought that the construction, operation, and advantages of this construction will now be clearly understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction and in the combination and arrangement of parts may be resorted to without departing from the spirit or scope of the invention as hereinafter claimed or sacrificing any of its advantages.

Having thus described my invention what I claim as new is:

1. A mechanism of the class described including a main frame, a pair of rollers disposed in a horizontal plane, means for yieldably mounting the rollers on the frame, another roller disposed in a vertical plane, means for yieldably mounting the vertical roller towards the frame, and a cutter mounted on the frame in close proximity to the rollers.

2. A mechanism of the class described including a main frame, a pair of rollers disposed in a horizontal plane, means for yieldably mounting the rollers on the frame, another roller disposed in a vertical plane, means for yieldably mounting the vertical roller towards the frame, and a cutter mounted on the frame in close proximity to the rollers, the horizontal rollers being provided with beveled edges, all the edges of the rollers being roughened.

3. A mechanism of the class described including a wheeled chassis, a supporting structure mounted in the chassis, a pair of rods resiliently mounted in the upper portion of the supporting structure and extending downwardly, a frame attached to said rods, a roller journaled in said frame and disposed in a vertical plane, a pair of frames slidably engaged with the lower portion of the supporting structure, springs urging the pair of frames inwardly towards each other, and rollers journaled in said pair of frames.

4. A mechanism of the class described including a wheeled chassis, a supporting structure mounted in the chassis, a pair of rods resiliently mounted in the upper portion of the supporting structure and extending downwardly, a frame attached to said rods, a roller journaled in said frame and disposed in a vertical plane, a pair of frames slidably engaged with the lower portion of the supporting structure, springs urging the pair of frames inwardly towards each other, rollers journaled in said pair of frames, a cutting mechanism associated with and grouped with the rollers.

5. A mechanism of the class described including a wheeled chassis, a supporting structure mounted in the chassis, a pair of rods resiliently mounted in the upper portion of the supporting structure and extending downwardly, a frame attached to said rods, a roller journaled in said frame and disposed in a vertical plane, a pair of frames slidably engaged with the lower portion of the supporting structure, springs urging the pair of frames inwardly towards each other, rollers journaled in said pair of frames, a cutting mechanism associated with and grouped with the rollers, the pair of rollers being disposed in a horizontal plane.

6. A mechanism of the class described including a wheeled chassis, a supporting structure mounted in the chassis, a pair of rods resiliently mounted in the upper portion of the supporting structure and extending downwardly, a frame attached to said rods, a roller journaled in said frame and disposed in a vertical plane, a pair of frames slidably engaged with the lower portion of the supporting structure, springs urging the pair of frames inwardly towards each other, rollers journaled in said pair of frames, a cutting mechanism associated with and grouped with the rollers, the pair of rollers being disposed in a horizontal plane, and having their peripheries beveled.

7. A mechanism of the class described including a wheeled chassis, a supporting structure mounted in the chassis, a pair of rods resiliently mounted in the upper portion of the supporting structure and extending downwardly, a frame attached to said rods, a roller journaled in said frame and disposed in a vertical plane, a pair of frames slidably engaged with the lower portion of the supporting structure, springs urging the pair of frames inwardly towards each other, rollers journaled in said pair of frames, and a cutting mechanism associated with and grouped with the rollers, the pair of rollers being disposed in a horizontal plane, and having their peripheries beveled, the peripheries of all the rollers being roughened.

8. A mechanism of the class described including a main frame, a pair of rollers disposed in a horizontal plane, means for yieldably mounting the rollers on the frame, another roller disposed in a vertical plane, means for yieldably mounting the vertical roller towards the frame, a cutting mechanism grouped with the rollers and provided with an aperture and a pair of arcuate slots, a guide member having a pin rotatable in the opening and bolts slidable in the slots.

In testimony whereof I affix my signature.

JOHN W. BRIGHT.